US008533923B2

(12) United States Patent
Strand

(10) Patent No.: US 8,533,923 B2
(45) Date of Patent: Sep. 17, 2013

(54) METHOD AND DEVICE FOR CHAIN WHEEL CHANGE

(75) Inventor: Thor Strand, Kristiansand (NO)

(73) Assignee: National Oilwell Varco Norway AS (NO)

( * ) Notice: Subject to any disclaimer, the term of this patent is extended or adjusted under 35 U.S.C. 154(b) by 396 days.

(21) Appl. No.: 12/988,589

(22) PCT Filed: Apr. 16, 2009

(86) PCT No.: PCT/NO2009/000147
§ 371 (c)(1),
(2), (4) Date: Nov. 15, 2010

(87) PCT Pub. No.: WO2009/131463
PCT Pub. Date: Oct. 29, 2009

(65) Prior Publication Data

US 2011/0047773 A1 Mar. 3, 2011

(30) Foreign Application Priority Data

Apr. 21, 2008 (NO) .................................... 20081890

(51) Int. Cl.
*B23P 6/00* (2006.01)
*B23P 19/00* (2006.01)

(52) U.S. Cl.
USPC ...... 29/402.08; 29/802; 29/402.03; 29/426.1; 29/426.5

(58) Field of Classification Search
USPC ................... 29/402.03, 402.08, 426.1, 426.3, 29/426.5, 802, 700, 244, 252, 255, 278, 281.5, 803; 295/43; 254/2 B, 133 R, 93 R
See application file for complete search history.

(56) References Cited

U.S. PATENT DOCUMENTS 3,744,760 A 7/1973 Uher
6,895,646 B1 * 5/2005 Houg .............................. 29/252

FOREIGN PATENT DOCUMENTS

WO WO01/96227 12/2001

OTHER PUBLICATIONS

International Search Report and Written Opinion dated Sep. 3, 2009; for Appl. No. PCDT/NO2009/000147; (2 p.).

* cited by examiner

*Primary Examiner* — David Bryant
*Assistant Examiner* — Lawrence Burkart
(74) *Attorney, Agent, or Firm* — Conley Rose, P.C.

(57) ABSTRACT

A method for changing a chain wheel, a first chain wheel being on an axle, the method comprising (a) positioning a hydraulic cylinder at least partially within the axle. In addition, the method comprises (b) moving the first chain wheel off the axle with the hydraulic cylinder. Further, the method comprises (c) connecting the first chain wheel to a conveying device while the first chain wheel is held in position by the hydraulic cylinder. Still further, the method comprises (d) connecting a second chain wheel to the hydraulic cylinder while the second chain wheel is held in position by the conveying device. Moreover, the method comprises (e) moving the second chain wheel onto the axle with the hydraulic cylinder.

15 Claims, 3 Drawing Sheets

METHOD AND DEVICE FOR CHAIN WHEEL CHANGE

CROSS REFERENCE TO RELATED APPLICATION

This application is a National Phase entry of PCT Application No. PCT/NO2009/000147, filed 16 Apr. 2009 which claims priority to Norwegian Application No. 20081890, filed 21 Apr. 2008, both of which are incorporated herein by reference.

STATEMENT REGARDING FEDERALLY SPONSORED RESEARCH OR DEVELOPMENT

Not applicable.

BACKGROUND OF THE INVENTION

A method for a chain wheel change is provided. More particularly it relates to the change of a chain wheel which is on an axle. There is also provided a device for practising the method.

A chain wheel which is used to handle an anchor chain on board a vessel often needs to be changed to work together with a chain of a different dimension. A chain wheel is subjected to considerable wear and thereby constitutes a wear part which must be replaced from time to time or be brought to a workshop for repair. Chain wheels of this kind are relatively big and heavy.

According to the prior art, chain wheels are removed and fitted by means of lifting tools and manually operated equipment, which may be fraught with danger, especially when the vessel is subjected to heavy sea. Thus, it is usual to go to shore, where chain wheels may be handled in a safe way within the relatively limited space available.

An interruption to change a chain wheel entails considerable costs.

The invention has for its object to remedy or reduce at least one of the drawbacks of the prior art.

The object is achieved according to the invention through the features which are specified in the description below and in the claims that follow.

SUMMARY OF THE PREFERRED EMBODIMENTS

A method for a chain wheel change is provided, a first chain wheel being on an axle, and the method being characterized by including:

- arranging a hydraulic cylinder at the axle;
- moving the first chain wheel off the axle by means of the cylinder;
- connecting the first chain wheel to a conveying device while it is held in position by the cylinder;
- connecting a second chain wheel to the cylinder while it is held in position by the conveying device; and
- moving the second chain wheel onto the axle by means of the cylinder.

It is possible to let the cylinder constitute a guide for the respective chain wheels during their movement to and from the axle.

The method may include placing the first chain wheel in a suitable storage place after disconnection from the cylinder.

For the method to be practised, a device is provided which is characterized by the hydraulic cylinder being fixed to the axle while the cylinder is being connected to the first chain wheel by means of an adapter.

The cylinder may be placed, at least partially, in the axle, which contributes to a relatively compact construction.

The cylinder may constitute a guide for the chain wheel. This may help the chain wheel to be moved steadily.

The cylinder may cooperate with a conveying device, the first chain wheel being connected to the cylinder during connection to the conveying device. There is thereby insignificant risk of the chain wheel moving during this part of the operation.

The adapter may complementarily fit the cylinder and the conveying device, the conveying device possibly being constituted by a carriage running on rails.

It is advantageous, but no condition, for the entire cylinder to be inside the bore of the axle. However, the cylinder should be constructed in such a way that it can absorb the bending moments arising because of the weight of the chain wheel.

The method and device provided make it possible for a chain wheel replacement to be carried out while the chain wheel is connected to either the cylinder or the conveying device. The replacement may thereby be carried out in a controlled manner without the risk of the chain wheel moving unintendedly. This reduces to a substantial extent the risk of injuries and also provides for the replacement of chain wheels while the vessel is in the open sea.

BRIEF DESCRIPTION OF THE DRAWINGS

In what follows is described an example of a preferred embodiment which is visualized in the accompanying drawings, in which.

DETAILED DESCRIPTION OF THE PREFERRED EMBODIMENTS

Figure 1:
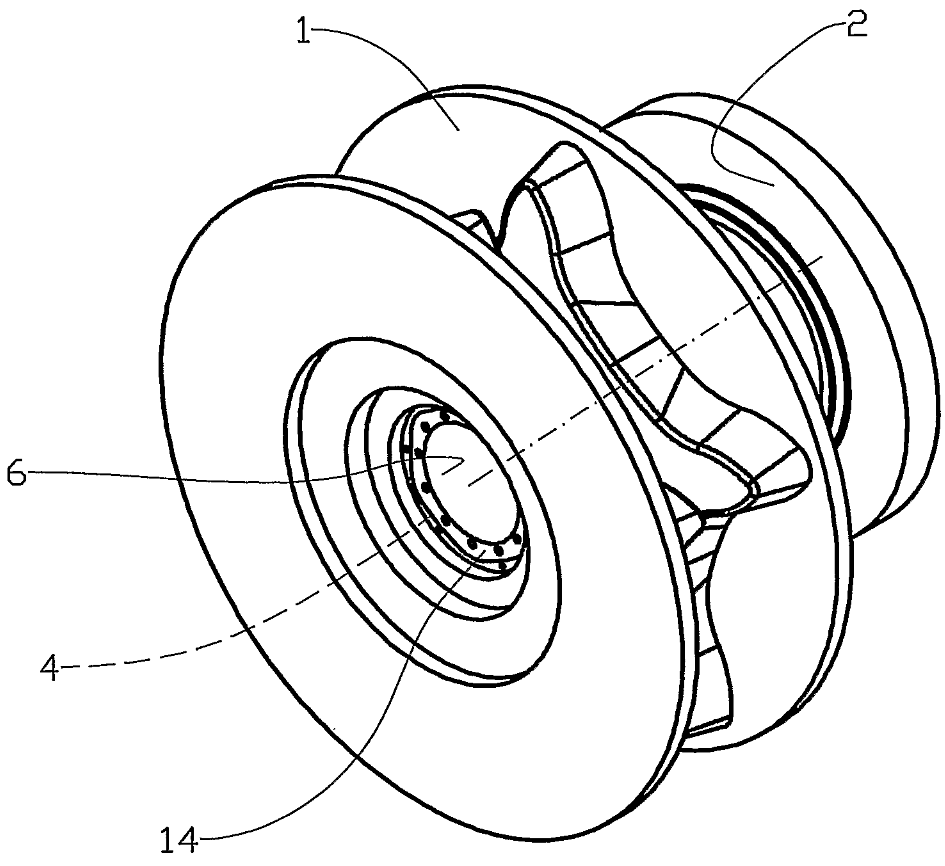
FIG. 1 shows, in perspective, a chain wheel which is on an axle.

In the drawings the reference numeral 1 indicates a chain wheel which is on a flanged axle 2 in FIG. 1. A driving portion 4 of the bore 6 of the chain wheel 1 is given a cornered shape which complementarily fits the axle 2. The axle 2 forms part of an anchor winch 8.

Normally, a first chain wheel 1*a* is replaced with a second chain wheel 1*b*. In this detailed description both chain wheels 1*a*, 1*b* are indicated by "chain wheel 1".

A hydraulic cylinder 10 is positioned in an axial bore 12 in the axle 2. The bore 12 is open at the free end portion 14 of the axle 2. The cylinder 10, which is, with advantage, removed from the axle 2 during normal operation, is connected to the axle 2 by means of a first bolt connection 16 which may include several bolts.

The cylinder 10 comprises a cylinder housing 18 with a first guide sleeve 20 and a piston rod 22 which is movable in the guide sleeve 20 and which is connected to a piston 24. The piston 24 is movable in the cylinder housing 18. Necessary seals in the guide sleeve 20 and piston 24 are not shown. The piston 24 divides the cylinder housing, in a known manner, into a plus chamber 26 and a minus chamber 28. The guide sleeve 20 and piston 24 constitute slide bearings against their respective abutments.

A first liquid bore 30 extends axially through the piston rod 22 and ends in the plus chamber 26 whereas a second liquid bore 32 in the piston rod 22 ends in the minus chamber 28.

The liquid bores 30, 32 are connected, in a manner known per se, to a hydraulic aggregate not shown.

The piston rod 22 is connected by means of a second bolt connection 34 to an adapter 36, the adapter 36 being connected to the chain wheel 1 by means of a threaded connection not shown.

Figure 4:
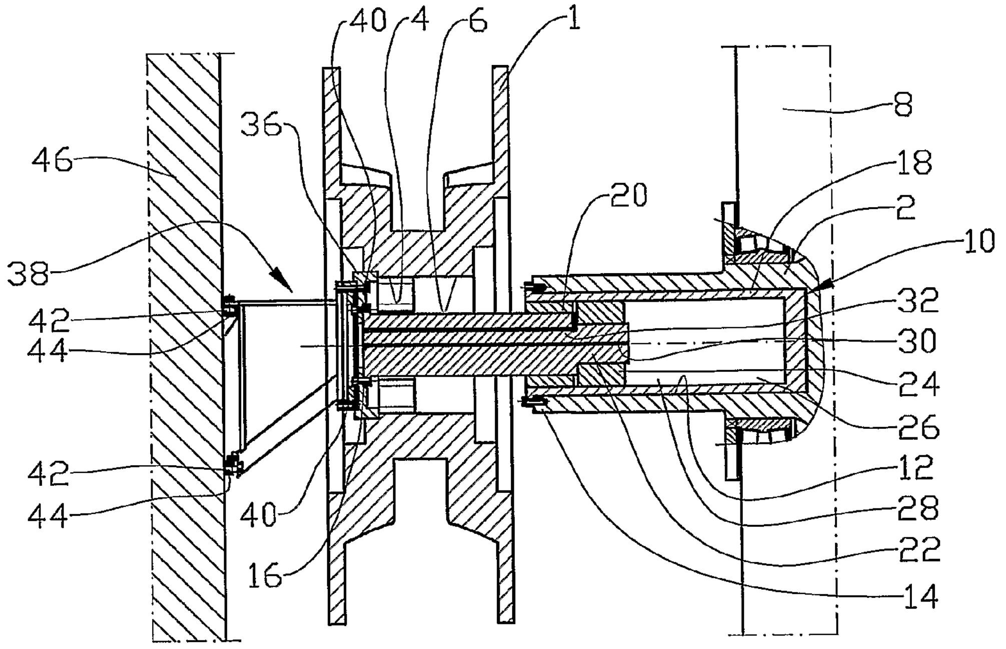
FIG. 4 shows the same as FIG. 2 but after the chain wheel has been moved completely off the axle.

The adapter 36 also fits a conveying device 38 in the form of a carriage and can be connected to the conveying device 38 by means of a third bolt connection 40, see FIG. 4.

The conveying device 38 is provided with castors 42 running in horizontal rails 44 on an adjacent structure 46.

Figure 2:
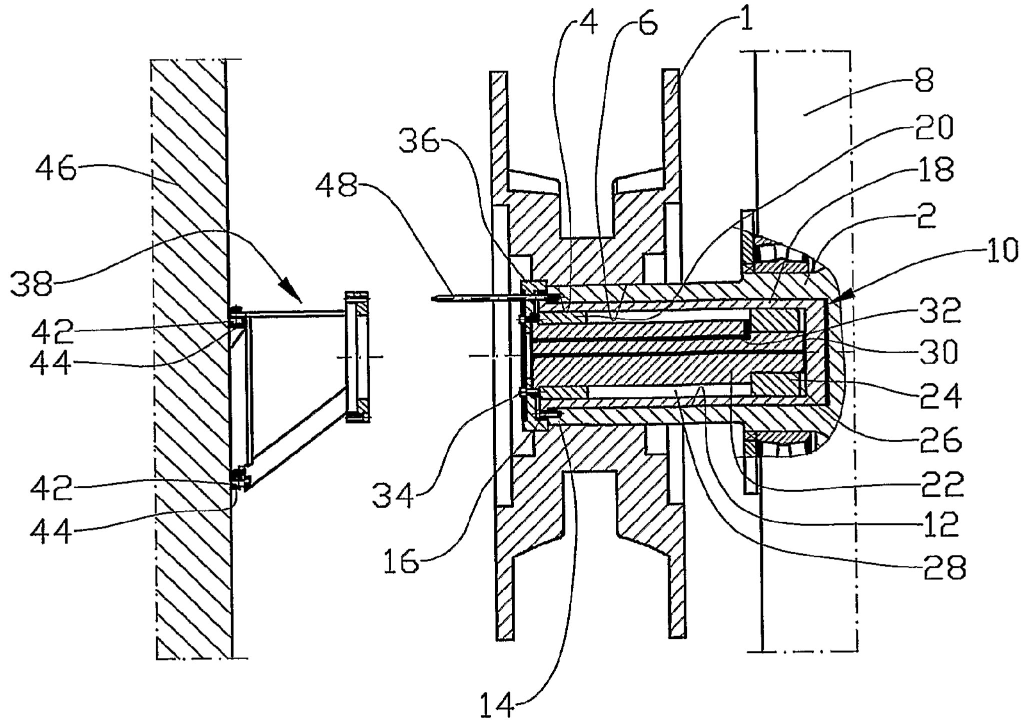
FIG. 2 shows an axial section of the chain wheel and axle.

In FIG. 2 is shown a guide mandrel 48. This is used when the chain wheel 1 is to be steered onto the axle 2, to ensure that the chain wheel 1 will be in the desired rotational position relative to the axle 2.

When a chain wheel 1 is to be changed after securing means, not shown, between the chain wheel 1 and axle 2 have been removed, the cylinder 10 is positioned in the bore 12 of the axle 2 and fixed to the axle 2 by means of the first bolt connection 16.

Subsequently, the adapter 36 is fitted to the chain wheel 1 and to the piston rod 22 by means of the second bolt connection 34, see FIG. 2.

Figure 3:
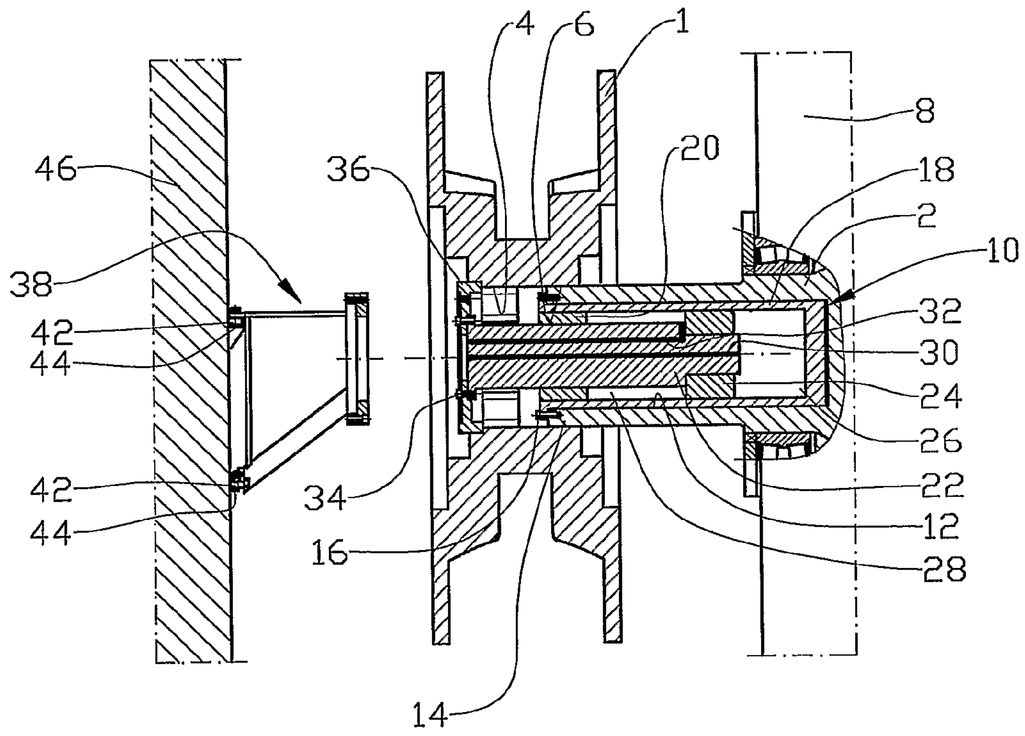
FIG. 3 shows the same as FIG. 2 but after the chain wheel has been moved somewhat outwards on the axle.

Pressure fluid is then carried via the first liquid bore 30 to the plus chamber 26, whereby the piston 24 moves the piston rod 22, adapter 36 and thereby the chain wheel 1 outwards on the axle 2, see FIG. 3.

On further movement, the adapter 36 hits the conveying device 38 and is secured to the conveying device 38 by means of the third bolt connection 40, see FIG. 4, in which the chain wheel 1 has been moved off the axle 2.

Figure 5:
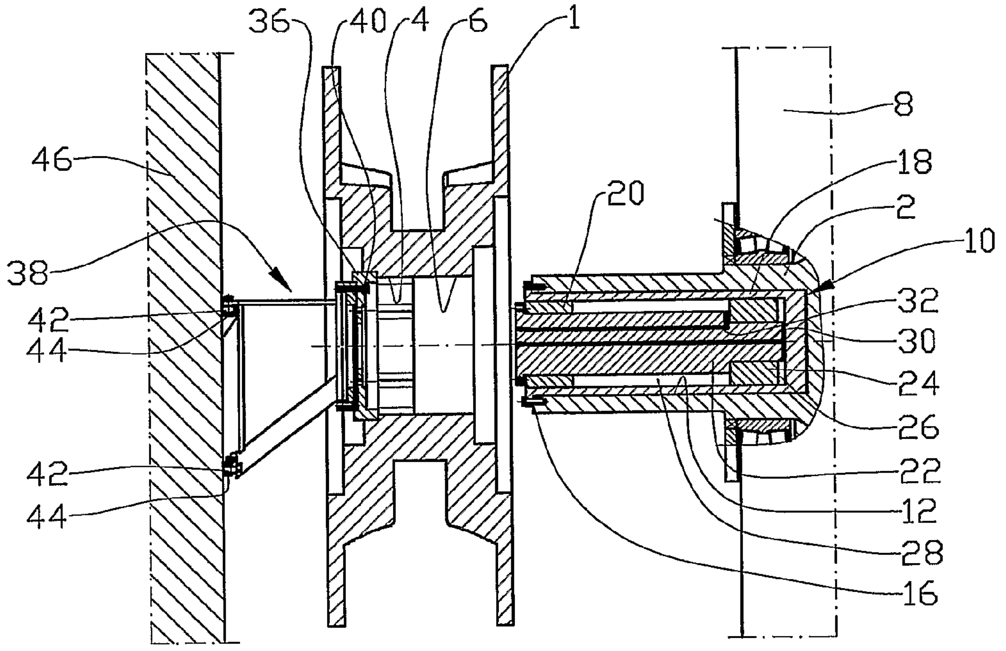
FIG. 5 shows the same as FIG. 2 but after the chain wheel has been released from the axle and is ready to be carried away.

The piston rod 22 is disconnected from the adapter 36 by removal of the second bolt connection 34. By applying pressure fluid to the minus chamber 28 via the second liquid bore 32 while the chamber 26 is simultaneously being drained via the first liquid bore 30, the piston rod 22 is moved into the cylinder housing 18. The chain wheel 1 may then be moved along the rails 44 transversally to the axle 2, see FIG. 5.

When a chain wheel 1 is to be fitted on the axle 2, the operation is carried out as described above, but in the reverse order. As mentioned, the guide mandrel 48 is used to simplify the assembly work.

The invention claimed is:

1. A method for changing a chain wheel, comprising:

(a) positioning a hydraulic cylinder at least partially withinan axle, wherien a first chain wheel is mounted on the axle;

(b) moving the first chain wheel off the axle with the hydraulic cylinder;

(c) connecting the first chain wheel to a conveying device while the first chain wheel is held in position by the hydraulic cylinder;

(d) connecting a second chain wheel to the hydrualic cylinder while the second chain wheel is held in position by the conveying device; and (e) moving the second chain wheel onto the axle with the hydraulic cylinder.

2. The method of claim 1, further comprising letting the hydraulic cylinder form a guide for the respective chain wheels during their movement to and from the axle.

3. The method of claim 1, further comprising placing the first chain wheel in a suitable storage place after disconnection from the hydraulic cylinder.

4. A device for changing a chain wheel, comprising:

an axle having a central axis;

a first chain wheel mounted on the axle;

a hydraulic cylinder including an outer housing at least partially disposed in the axle and a piston moveably disposed in the outer housing, wherein the piston is configured to move axially through the outer housing;

wherein the outer housing is coupled to the axle and the piston is releasably coupled to the first chain wheel with an adapter.

5. The device of claim 4, wherein the hydraulic cylinder is configured to move the first chain wheel axially relative to the axle.

6. The device of claim 4, wherein a piston rod extends from the piston;

wherein the adapter is releasably attached to an end of the piston rod;

wherein the adapter is releasably attached to the first chain wheel; and wherein the outer housing is fixably attached to the axle.

7. The device of claim 4, further comprising a conveying device;

wherein the adapter is configured to releasably couple to the conveying device.

8. The device of claim 7, wherein the conveying device comprises a carriage moveably coupled to one or more rails.

9. The device of claim 7, wherein the hydraulic cylinder is configured to transfer the first chain wheel from the axle to the conveying device.

10. A device for changing a chain wheel, comprising:

an axle having a central axis;

a first chain wheel mounted on the axle;

a hydraulic cylinder including an outer housing coupled to the axle, a piston moveably disposed in the outer housing, and a piston rod extending from the piston, wherein the piston is configured to move axially through the outer housing;

wherein an adapter mounted to an end of the piston rod is releasably coupled to the first chain wheel.

11. The device of claim 10, wherein the outer housing is fixably attached to the axle.

12. The device of claim 10, wherein the hydraulic cylinder is configured to move the first chain wheel axially relative to the axle.

13. The device of claim 12, further comprising a conveying device, wherein the adapter is configured to releasably couple to the first chain wheel to the conveying device.

14. The device of claim 13, wherein the conveying device comprises a carriage moveably coupled to one or more rails.

15. The device of claim 13, wherein the hydraulic cylinder is configured to transfer the first chain wheel from the axle to the conveying device.

* * * * *

UNITED STATES PATENT AND TRADEMARK OFFICE

CERTIFICATE OF CORRECTION

PATENT NO. : 8,533,923 B2
APPLICATION NO. : 12/988589
DATED : September 17, 2013
INVENTOR(S) : Thor Strand It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 421 days.

Signed and Sealed this
Fifteenth Day of September, 2015

Michelle K. Lee

Michelle K. Lee
*Director of the United States Patent and Trademark Office*